US009306451B2

(12) United States Patent
Ouyang

(10) Patent No.: US 9,306,451 B2
(45) Date of Patent: Apr. 5, 2016

(54) SWITCH MODE POWER SUPPLY CONTROL CIRCUIT TO REDUCE OVERSHOOT OF AN OUTPUT VOLTAGE

(71) Applicant: Chengdu Monolithic Power Systems Co., Ltd., Chengdu (CN)

(72) Inventor: Qian Ouyang, Hangzhou (CN)

(73) Assignee: Chengdu Monolithic Power Systems Co., Lt.d, Chengdu (CN)

( * ) Notice: Subject to any disclaimer, the term of this patent is extended or adjusted under 35 U.S.C. 154(b) by 285 days.

(21) Appl. No.: 14/014,318

(22) Filed: Aug. 29, 2013

(65) Prior Publication Data

US 2014/0062434 A1 Mar. 6, 2014

(30) Foreign Application Priority Data

Aug. 29, 2012 (CN) .......................... 2012 1 0311563

(51) Int. Cl.
H02M 3/157 (2006.01)
H02M 3/156 (2006.01)
H02M 3/158 (2006.01)

(52) U.S. Cl.
CPC .............. H02M 3/156 (2013.01); H02M 3/158 (2013.01)

(58) Field of Classification Search
CPC ....... H02M 1/08; H02M 3/156; H02M 3/157; H02M 1/158

USPC ............ 323/271, 283, 284; 363/56.05, 56.08, 363/56.11
See application file for complete search history.

(56) References Cited

U.S. PATENT DOCUMENTS

| 7,843,179 | B2 * | 11/2010 | Hasegawa et al. | 323/271 |
| 8,198,880 | B2 | 6/2012 | Ouyang | |
| 8,400,129 | B2 | 3/2013 | Ouyang | |
| 8,421,424 | B2 * | 4/2013 | Ishii | 323/222 |
| 8,669,748 | B2 * | 3/2014 | Ishii | 323/271 |
| 8,917,076 | B2 * | 12/2014 | Hsing et al. | 323/284 |
| 2008/0012542 | A1 * | 1/2008 | Liu et al. | 323/271 |
| 2012/0146606 | A1 | 6/2012 | Li | |
| 2012/0274235 | A1 * | 11/2012 | Lee et al. | 315/297 |
| 2013/0021009 | A1 * | 1/2013 | Waltman et al. | 323/271 |
| 2013/0207625 | A1 * | 8/2013 | Futamura | 323/271 |
| 2013/0308061 | A1 * | 11/2013 | Murakami et al. | 348/730 |
| 2014/0062434 | A1 * | 3/2014 | Ouyang | 323/271 |
| 2014/0143560 | A1 * | 5/2014 | Kwon et al. | 713/300 |
| 2015/0123631 | A1 * | 5/2015 | Hang et al. | 323/271 |

* cited by examiner

Primary Examiner — Jeffrey Sterrett
(74) Attorney, Agent, or Firm — Perkins Coie LLP

(57) ABSTRACT

A switch mode power supply having an output terminal configured to provide an output voltage which is regulated to an output target, the switch mode power supply has a first switch and a control circuit. When the output voltage increases to a first threshold voltage, the control circuit is configured to turn OFF the first switch until a time period expires.

20 Claims, 8 Drawing Sheets

SWITCH MODE POWER SUPPLY CONTROL CIRCUIT TO REDUCE OVERSHOOT OF AN OUTPUT VOLTAGE

CROSS-REFERENCE TO RELATED APPLICATION(S)

This application claims the benefit of CN Application No. 201210311563.3, filed on Aug. 29, 2012, and incorporated herein by reference.

TECHNICAL FIELD

The present invention relates to electrical circuit, more particularly but not exclusively relates to switch mode power supply.

BACKGROUND

Many electronic products, such as laptop, desktop, PDA and so on, need direct current (DC) power supply. With the development of electronic technology, fast load transient response is needed. But some problem may be introduced with fast load transient response, e.g., overshoot of an output voltage.

As shown in FIG. 1, take a constant-ON time controlled step-down converter as one example, at time T0, a load current IO increases at a fast rate, then an output voltage VO decreases quickly, an inductor current IL increases slowly, and at least one switch is periodically turned ON at a constant-ON time period until output voltage VO increases to an output target DVO. For simplicity, inductor current IL shown in FIG. 1 represents an average inductance current. Due to an output capacitor, output voltage VO is not in-phase but has a phase delay to inductor current IL. When output voltage VO increases to output target DVO at time T1, inductor current IL becomes much higher than load current IO and would charge output voltage VO to a higher value, as a result, an overshoot of output voltage VO happens.

SUMMARY

It is one of the objects of the present invention to provide switch mode power supply, control circuit and associated control method to reduce or avoid overshoot of an output voltage caused by load current changes.

One embodiment of the present invention discloses a control circuit for controlling a switch mode power supply, the switch mode power supply comprises a first switch, wherein the control circuit is configured to turn ON and/or turn OFF the first switch and is configured to regulate an output voltage of the switch mode power supply to an output target, and wherein the control circuit is configured to turn OFF the first switch and maintain a time period to reduce overshoot of the output voltage when the output voltage increases to a first threshold voltage, wherein the first threshold voltage is less than the output target.

Another embodiment of the present invention discloses a switch mode power supply, wherein the switch mode power supply may comprise a first switch and the control circuit described above.

Yet another embodiment of the present invention discloses a control method for a switch mode power supply, the switch mode power supply comprises a first switch and a control circuit for turning ON and/or turning OFF the first switch, wherein the control method comprises turning OFF the first switch and maintaining a time period to reduce overshoot of an output voltage of the switch mode power supply before the output voltage increases to an output target.

In one embodiment, overshoot of an output voltage is reduced via turning OFF the first switch and maintaining a time period before the output voltage increases to an output target.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Several embodiments of the present invention are described below with reference to switch mode power supply, control circuit and associated control method. As used hereinafter, the term "couple" generally refers to multiple ways including a direct connection with an electrical conductor and an indirect connection through intermediate diodes, resistors, capacitors, and/or other intermediaries.

Figure 1:
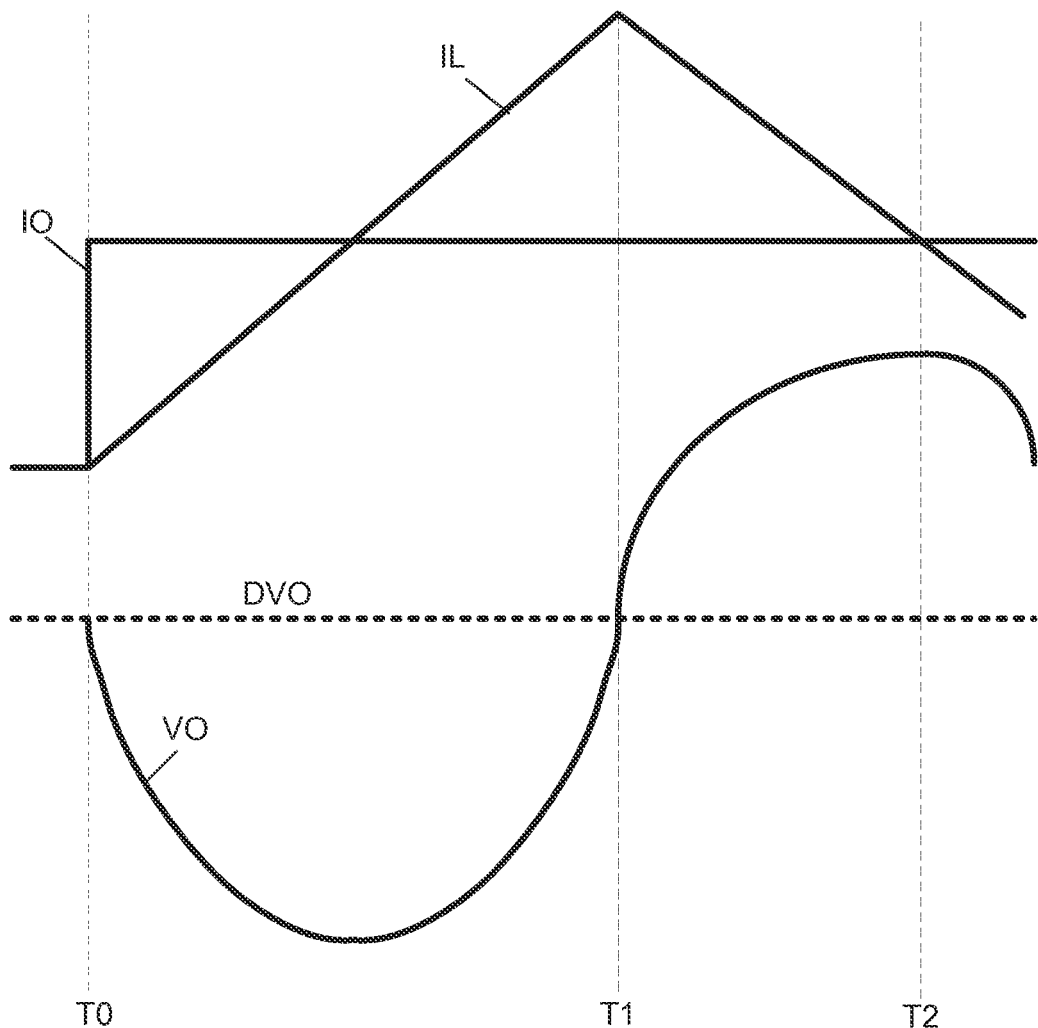
FIG. 1 shows waveforms illustrating an inductor current and an output voltage of a traditional constant-ON time controlled step-down converter when load current increases at a fast rate.
Figure 2:
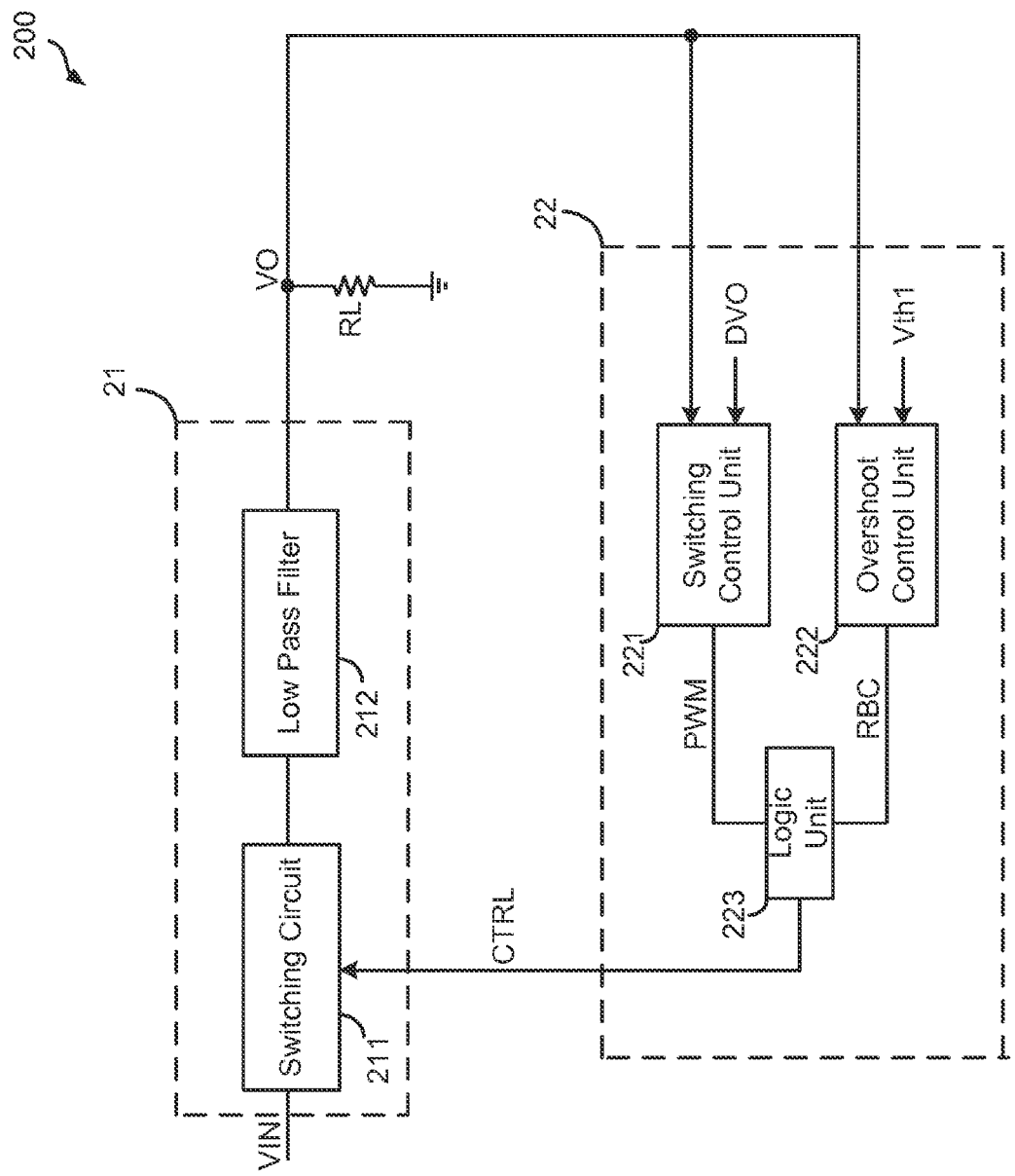
FIG. 2 illustrates a circuit block diagram of a switch mode power supply 200 according to an embodiment of the present invention.

FIG. 2 illustrates a circuit block diagram of a switch mode power supply 200 according to an embodiment of the present invention. Switch mode power supply 200 comprises a power stage circuit 21 and a control circuit 22.

Power stage circuit 21 comprises a switching circuit 211 and a low pass filter 212, wherein switching circuit 211 comprises a first switch. In one embodiment, low pass filter 212 comprises an inductor and a capacitor. Switching circuit 211 is configured to receive an input voltage VIN and is configured to provide an output voltage VO through low pass filter 212, wherein output voltage VO is configured to regulate to an output target DVO. Switching circuit 211 is configured to provide output voltage VO from input voltage VIN via turning ON and/or turning OFF the first switch. A load RL is coupled between output voltage VO and a system ground. Power stage circuit 21 may adopt any direct current to direct current (DC/DC) circuit or alternating current to direct current (AC/DC) circuit, such as step-up converter, step-down converter, half-bridge converter and so on.

Control circuit 22 comprises a switching control unit 221, an overshoot control unit 222 and a logic unit 223. Control circuit 22 is configured to provide a switching control signal CTRL to turn ON and/or turn OFF the first switch to regulate output voltage VO. Control circuit 22 may be integrated on a chip. In one embodiment, control circuit 22 may be realized via analog integrated circuit. In another embodiment, control circuit 22 may be realized via digital circuit, such as MCU, DSP, FPGA and ASIC.

Switching control unit 221 is configured to provide a pulse signal PWM based on output voltage VO and output target DVO. In one embodiment, switching control unit 221 is coupled to output voltage VO and a reference voltage VREF, wherein reference voltage VREF equals to output target DVO. In another embodiment, reference voltage VREF equals to sum of output target DVO, a compensation signal and any other suitable signal. In one embodiment, switching control unit 221 may be coupled to output voltage VO through a feedback circuit. In one embodiment, switching control unit 221 is configured to receive reference voltage VREF and a feedback signal VFB representing output voltage VO, and switching control unit 221 is configured to provide pulse signal PWM via comparing feedback signal VFB with reference voltage VREF, wherein reference voltage VREF is related to output target DVO, e.g., VREF=DVO*K, where K is a ratio between feedback signal VFB and output voltage VO. Switching control unit 221 may adopt any suitable control method, such as voltage control, current control, non-line control, constant-ON time control, constant-OFF time control and so on.

In order to reduce or eliminate overshoot of output voltage VO, overshoot control unit 222 is configured to turn OFF the first switch and maintain a predetermined OFF time period Toff before output voltage VO increases to output target DVO. In one embodiment, overshoot control unit 222 is coupled to output voltage VO and a threshold voltage Vth1, and is configured to provide an overshoot control signal RBC. When output voltage VO increases to threshold voltage Vth1, overshoot control signal RBC transits to effective, e.g., low voltage level. After a time period (e.g., OFF time period Toff) maintained effective, overshoot control signal RCB transits to ineffective, e.g., high voltage level. When overshoot control signal RCB is effective, control circuit 22 is configured to turn OFF the first switch, and when overshoot control signal RCB is ineffective, the first switch resumes normal operation, i.e., the first switch is turned ON and/or turned OFF under the control of switching control unit 221. In one embodiment, OFF time period Toff is a preset value. In another embodiment, OFF time period Toff may be adjusted online according to circuit parameters of switch mode power supply 200. In another embodiment, OFF time period Toff may be stored in a register and may be adjusted via a communication BUS, such as I2C, SMBUS and so on. In one embodiment, threshold voltage Vth1 is less than output target DVO.

Logic unit 223 is configured to receive pulse signal PWM and overshoot control signal RBC, and is configured to provide switching control signal CTRL to turn ON and/or turn OFF the first switch based on pulse signal PWM and overshoot control signal RBC. When overshoot control signal RBC is effective, switching control signal CTRL is configured to turn OFF the first switch, and when overshoot control signal RBC is ineffective, switching control signal CTRL is configured to control the first switch, e.g., turn ON and/or OFF the first switch, based on pulse signal PWM.

Figure 3:
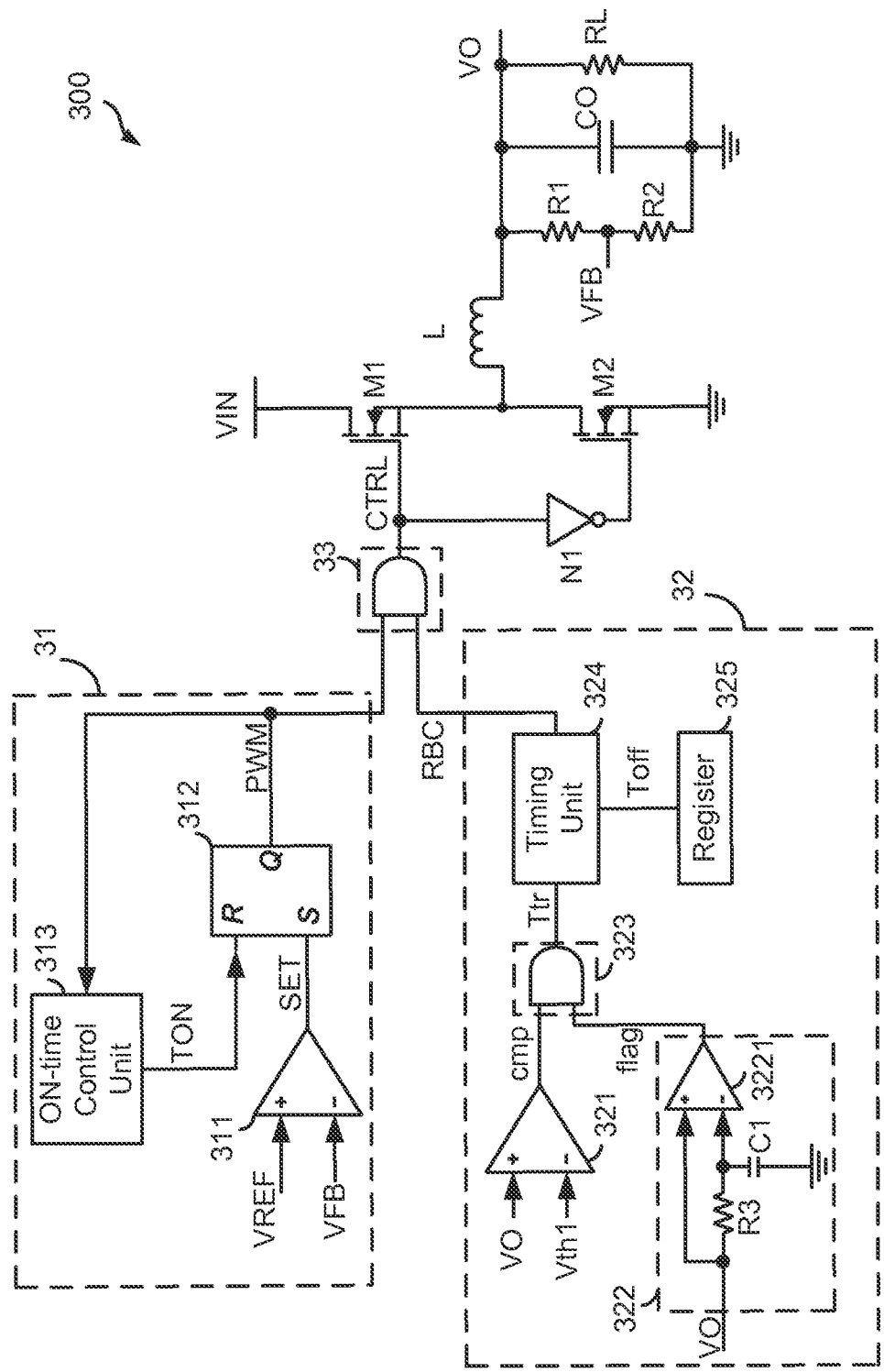
FIG. 3 schematically illustrates a step-down converter 300 according to an embodiment of the present invention.

FIG. 3 schematically illustrates a step-down converter 300 according to an embodiment of the present invention. FIG. 3 takes synchronous step-down topology as an example, and one of ordinary skill in the art will appreciate that any other suitable topologies may also be used without detracting from the merits of the present invention. A power stage circuit of step-down converter 300 comprises a high-side switch M1, a low-side switch M2, an inductor L and an output capacitor CO. Control circuit of step-down converter 300 comprises a switching control unit 31, an overshoot control unit 32 and a logic unit 33. In one embodiment, step-down converter 300 comprises a feedback circuit comprising a resistor R1 and a resistor R2. Resistor R1 comprises a first terminal and a second terminal, wherein the first terminal is coupled to output voltage VO. Resistor R2 comprises a first terminal and a second terminal, wherein the first terminal is coupled to the second terminal of resistor R1, and the second terminal is coupled to the system ground. A common node of resistor R1 and resistor R2 is configured to provide feedback signal VFB.

High-side switch M1 comprises a first terminal, a second terminal and a control terminal, wherein the first terminal is coupled to input voltage VIN. Low-side switch M2 comprises a first terminal, a second terminal and a control terminal, wherein the first terminal is coupled to the second terminal of high-side switch M1, the second terminal is coupled to the system ground. Inductor L comprises a first terminal and a second terminal, wherein the first terminal is coupled to the second terminal of high-side switch M1 and the first terminal of low-side switch M2. Output capacitor CO comprises a first terminal and a second terminal, wherein the first terminal is coupled to the second terminal of inductor L, the second terminal is coupled to the system ground. High-side switch M1 and/or low-side switch M2 may be a Bipolar Junction Transistor (BJT), a Junction Field Effect Transistor (JFET), a Metal Oxide Semiconductor Field Effect Transistor (MOSFET), an Insulated Gate Transistor (IGBT), etc. In one embodiment, low-side switch M2 may be replaced by a diode. In the example shown in FIG. 3, low-side switch M2 is an N-type MOSFET. In another embodiment, low-side switch M2 may be a P-type MOSFET.

In the example shown in FIG. 3, switching control unit 31 comprises a comparator 311, a RS (reset and set) flip-flop 312 and an ON-time control unit 313. Comparator 311 comprises a first input terminal, a second input terminal and an output terminal, wherein the first input terminal may be a non-inverting terminal and the second input terminal may be an inverting terminal. In one embodiment, the first input terminal of comparator 311 is coupled to reference voltage VREF, and the second input terminal of comparator 311 is coupled to feedback signal VFB. Reference voltage VREF represents output target DVO or a summation of output target DVO and a compensation signal. Reference voltage VREF may be a constant direct current (DC) voltage or a real-time adjusted direct current (DC) voltage. The output terminal of comparator 311 is configured to provide a set signal SET via comparing reference voltage VREF with feedback signal VFB. In one embodiment, when feedback signal VFB is less than reference voltage VREF, set signal SET is effective, e.g., high voltage level, and when feedback signal VFB is larger than reference voltage VREF, set signal SET is ineffective, e.g., low voltage level. RS flip-flop 312 comprises a set input terminal S, a reset input terminal R and an output terminal Q, wherein set input terminal S is coupled to the output terminal of comparator 311, reset input terminal R is coupled to an output terminal of ON-time control unit 313, and output terminal Q is configured to provide pulse signal PWM. ON-time control unit 313 is configured to receive pulse signal PWM and is configured to provide an ON-time control signal TON. When pulse signal PWM is effective, ON-time control unit 313 starts timing until a predetermined ON-time period expires, and then RS flip-flop 312 is reset by ON-time control signal TON to provide ineffective pulse signal PWM, high-side switch M1 is turned OFF. In one embodiment, ON-time control unit 313 is configured to receive input voltage VIN and output voltage VO, and is configured to provide a constant ON-time period VO/(VIN*fs), where fs is a switching frequency of step-down converter 300.

In the example shown in FIG. 3, overshoot control unit 32 comprises a comparing unit 321 and a timing unit 324.

Comparing unit 321 comprises a first input terminal, a second input terminal and an output terminal, wherein the first input terminal may be a non-inverting terminal and the second input terminal may be an inverting terminal. In one embodiment, the first input terminal is coupled to output voltage VO, and the second input terminal is coupled to threshold voltage Vth1. In the example shown in FIG. 3, when output voltage VO is larger than threshold voltage Vth1, comparing unit 321 is configured to provide a high voltage level comparing signal cmp, otherwise when output voltage VO is less than threshold voltage Vth1, comparing unit 321 is configured to provide low voltage level comparing signal cmp.

Timing unit 324 comprises a first input terminal, a second input terminal and an output terminal, wherein the first input terminal is coupled to the output terminal of comparing unit 321, the second input terminal is coupled to receive OFF time period Toff, and the output terminal is configured to provide overshoot control signal RBC. Timing unit 324 is configured to start timing in accordance with comparing signal cmp, and is configured to provide effective overshoot control signal RBC, e.g. low voltage level until OFF time period Toff expires. In one embodiment, when output voltage VO increases to threshold voltage Vth1, timing unit 324 starts timing, and overshoot control signal RBC becomes effective, and then after OFF time period Toff maintained effective, timing unit 324 stops timing and overshoot control signal RBC becomes ineffective.

In one embodiment, overshoot control unit 32 comprises a rising judge unit 322 which is employed to judge if output voltage VO is increasing. Rising judge unit 322 is configured to receive output voltage VO, and is configured to provide a status signal flag, wherein status signal flag is effective when output voltage VO is recognized increasing. In one embodiment, rising judge unit 322 comprises a slope judge circuit, wherein the slope judge circuit is configured to judge if output voltage VO is increasing via testing slope of output voltage VO. In one embodiment, rising judge unit 322 may comprise a delay circuit to provide a delayed output voltage, and rising judge unit 322 is configured to judge if output voltage VO is increasing via comparing the delayed output voltage with output voltage VO. In the example shown in FIG. 3, rising judge unit 322 comprises a resistor R3, a capacitor C1, and a comparator 3221. One terminal of resistor R3 is coupled to output voltage VO and the other terminal of resistor R3 is coupled to one terminal of capacitor C1, the other terminal of capacitor C1 is coupled to the system ground. Comparator 3221 comprises a first input terminal, a second input terminal and an output terminal, wherein the first input terminal may be a non-inverting terminal and the second input terminal may be an inverting terminal. In one embodiment, the first input terminal is coupled to output voltage VO, and the second input terminal is coupled to a common node of resistor R3 and capacitor C1 to receive the delayed output voltage. In the example shown in FIG. 3, when output voltage VO is increasing, output voltage VO is larger than the delayed output voltage, and rising judge unit 322 is configured to provide effective status signal flag, e.g., high voltage level.

In one embodiment, timing unit 324 is coupled to the output terminal of comparing unit 321 and the output terminal of rising judge unit 322 through a logic circuit 323. Logic circuit 323 comprises a first input terminal, a second input terminal and an output terminal, wherein the first input terminal is coupled to the output terminal of comparing unit 321, and the second input terminal is coupled to the output terminal of rising judge unit 322. Logic circuit 323 is configured to provide a timing trigger signal Ttr based on comparing signal cmp and status signal flag. When output voltage VO is larger than threshold voltage Vth1 and output voltage VO is recognized increasing, timing trigger signal Ttr is effective. In the example shown in FIG. 3, logic circuit 323 comprises an AND gate which is configured to provide effective timing trigger signal Ttr when both comparing signal cmp and status signal flag are effective, e.g., high voltage level. In one embodiment, when timing trigger signal Ttr turns effective, timing unit 324 starts timing and count up from zero, overshoot control signal RBC becomes effective; when a time period timing unit 324 timed equals to OFF time period Toff, timing unit 324 stops timing, and overshoot control signal RBC transits to ineffective.

In one embodiment, overshoot control unit 32 further comprises a register 325 which is employed to provide predetermined OFF time period Toff. OFF time period Toff may be set via a communication BUS such as I2C, SMBUS and so on. In another embodiment, OFF time period Toff may be calculated online (will be described below).

Logic unit 33 is configured to receive pulse signal PWM and overshoot control signal RBC and is configured to provide switching control signal CTRL to turn ON and/or turn OFF high-side switch M1 and low-side switch M2. In one embodiment, when overshoot control signal RBC is effective, switching control signal CTRL is configured to turn OFF high-side switch M1. And when overshoot control signal RBC is ineffective, switching control signal CTRL is configured to turn ON and/or turn OFF high-side switch M1 and low-side switch M2 based on pulse signal PWM. In the example shown in FIG. 3, logic unit 33 comprises an AND gate.

Figure 4:
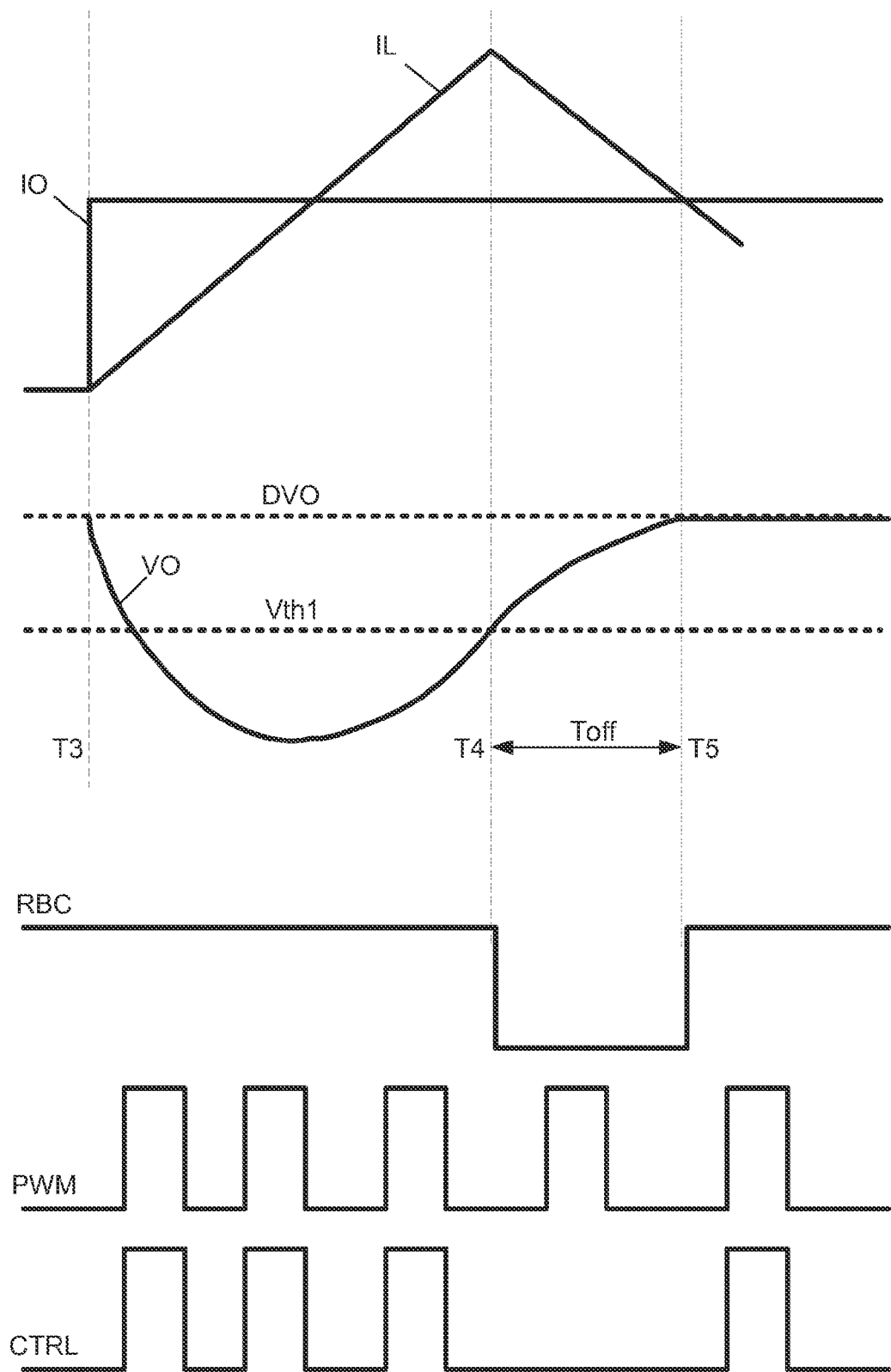
FIG. 4 shows waveforms illustrating signals of step-down converter 300 as shown in FIG. 3 when load current increases at a fast rate according to an embodiment of the present invention.

FIG. 4 shows waveforms illustrating signals of step-down converter 300 as shown in FIG. 3 when load current increases at a fast rate according to an embodiment of the present invention. As shown in FIG. 4, at time T3, load current IO increases at a fast rate, such as 100 A/us, output voltage VO decreases quickly, inductor current IL increases slowly, overshoot control signal RBC keeps high voltage level, i.e., ineffective, and switching control signal CTRL is determined by pulse signal PWM. At time T4, output voltage VO increases to threshold voltage Vth1, overshoot control signal RBC becomes low voltage level, i.e., effective, and switching control signal CTRL keeps low voltage level, i.e., ineffective, to maintain high-side switch M1 OFF. At time T5, a time period during which high-side switch M1 maintains OFF equals to predetermined OFF time period Toff, overshoot control signal RBC transits to ineffective (high voltage level as one example shown in FIG. 4), switching control signal CTRL is determined by pulse signal PWM, and high-side switch M1 resumes normal operation, i.e., controlled based on pulse signal PWM.

In the example shown in FIG. 4, when output voltage VO increases to threshold voltage Vth1, high-side switch M1 is turned OFF until predetermined OFF time period Toff expires. As a result, overshoot of output voltage VO is reduced via turning OFF high-side switch M1 ahead of time, because it is avoided that much more redundant energy be stored into inductor L.

In one embodiment, a control method for switch mode power supply is provided. The control method comprises turning OFF a first switch and maintaining the first switch OFF within a time period before output voltage VO increases to output target DVO, as a result, overshoot of output voltage VO is reduced. In one embodiment, when output voltage VO increases to threshold voltage Vth1, the first switch is turned OFF and the first switch maintains OFF until OFF time period Toff expires, wherein threshold voltage Vth1 is less than output target DVO. OFF time period Toff may be set through a communication BUS such as I2C, SMBUS and so on. In another embodiment, OFF time period Toff may be calculated online (will be detailed described below).

Figure 5:
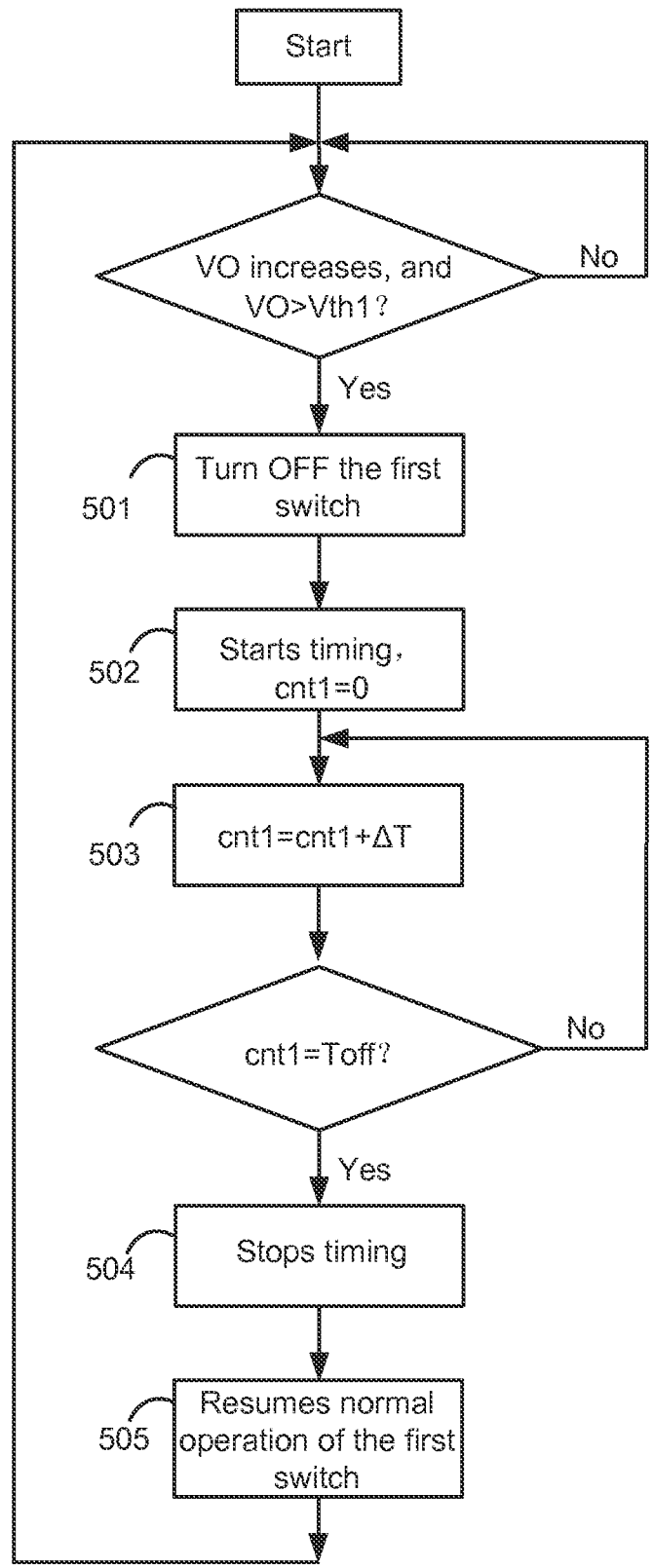
FIG. 5 shows a flow chart illustrating a control method with reference to switch mode power supply 200 shown in FIG. 2 according to an embodiment of the present invention.

FIG. 5 shows a flow chart illustrating a control method with reference to switch mode power supply 200 shown in FIG. 2 according to an embodiment of the present invention. When switch mode power supply 200 starts working, if output voltage VO increases larger than threshold voltage Vth1, then go into step 501. In step 501, the first switch is turned OFF. And then in step 502-504, the first switch is maintained OFF until predetermined OFF time period expires. In step 502, starts timing and a count signal cnt1 is reset to zero. In step 503, count signal cnt1 increases by one step, i.e., cnt1=cnt1+ΔT, where ΔT may be one or more system clock period. When a time period that count signal cnt1 representing does not equal to OFF time period Toff, returns to step 503. When time period that count signal cnt1 representing equals to OFF time period Toff, then go into step 504 to stop timing. In step 505, the first switch is resumed to normal operation, e.g., the first switch is turned ON and/or turned OFF by switching control unit 221.

Note that in the flow chart described above, the box functions may also be implemented with different order as shown in FIG. 5. For example, two successive box functions may be executed meanwhile, or sometimes the box functions may be executed in reverse order.

When output voltage VO increases to threshold voltage Vth1, the first switch is turned OFF until OFF time period Toff expires to reduce overshoot of output voltage VO at load current increasing condition. For different applications, different OFF time periods may be set via a communication BUS or external circuits. And different OFF time periods may be needed to achieve optimized effects for different load current conditions. When with long OFF time period Toff, load transient response is slow, and output voltage VO needs more time period increasing to output target DVO. When with short OFF time period Toff, load transient response is fast and output voltage VO may increase to output target DVO quickly, but overshoot of output voltage VO may be larger. An overshoot control circuit is proposed below to automatically calculate an optimized OFF time period Toff.

Figure 6:
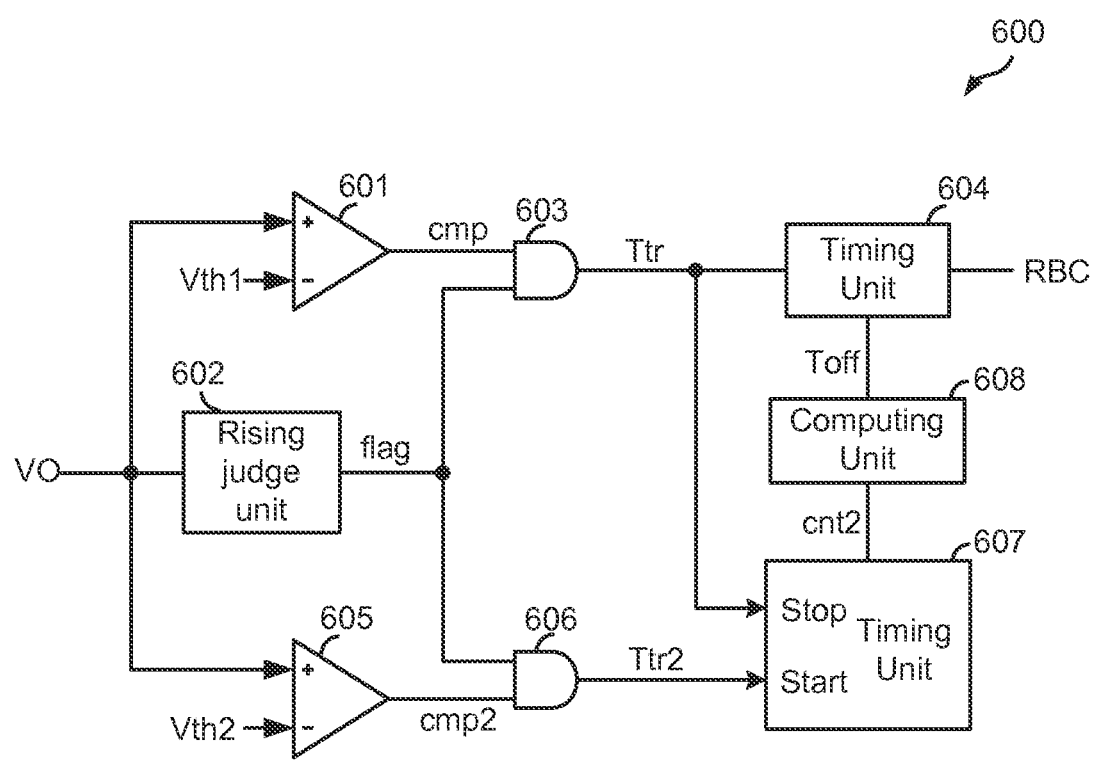
FIG. 6 schematically illustrates an overshoot control circuit 600 according to an embodiment of the present invention.

FIG. 6 schematically illustrates an overshoot control circuit 600 according to an embodiment of the present invention. When output voltage VO increases to threshold voltage Vth1, overshoot control circuit 600 is configured to turn OFF the first switch until OFF time period Toff expires, and OFF time period Toff is calculated based on a time interval during which output voltage VO increases from threshold voltage Vth2 to threshold voltage Vth1.

Overshoot control circuit 600 comprises a comparing unit 601, a rising judge unit 602, a logic circuit 603, a timing unit 604, a comparing unit 605, a logic circuit 606, a timing unit 607 and a computing unit 608.

Comparing unit 601 comprises a first input terminal, a second input terminal and an output terminal, wherein the first input terminal is coupled to output voltage VO, the second input terminal is coupled to threshold voltage Vth1, and the output terminal is configured to provide comparing signal cmp based on output voltage VO and threshold voltage Vth1. Rising judge unit 602 is configured to provide status signal flag based on output voltage VO. In one embodiment, rising judge unit 602 comprises a slope judge circuit, the slope judge circuit is employed to monitor slope of output voltage VO. In one embodiment, rising judge unit 602 is configured to compare the delayed output voltage with output voltage VO, and when output voltage VO is larger than the delayed output voltage, output voltage VO is recognized increasing. Logic circuit 603 comprises a first input terminal, a second input terminal and an output terminal, wherein the first input terminal is coupled to the output terminal of comparing unit 601, the second input terminal is coupled to the output terminal of rising judge unit 602, and the output terminal is configured to provide timing trigger signal Ttr. When output voltage VO is larger than threshold voltage Vth1 and output voltage VO is recognized increasing, timing trigger signal Ttr is effective, e.g., high voltage level. In the example shown in FIG. 6, logic circuit 603 comprises an AND gate. Timing unit 604 comprises a first input terminal, a second input terminal and an output terminal, wherein the first input terminal is coupled to the output terminal of logic circuit 603 to receive timing trigger signal Ttr, the second input terminal is coupled to receive OFF time period Toff, and the output terminal is configured to provide overshoot control signal RBC. When output voltage VO increases to threshold voltage Vth1, timing unit 604 is configured to start timing and provide effective overshoot control signal RBC, e.g., low voltage level, until OFF time period Toff expires.

Comparing unit 605 comprises a first input terminal, a second input terminal and an output terminal, wherein the first input terminal is coupled to output voltage VO, the second input terminal is coupled to threshold voltage Vth2, and the output terminal is configured to provide a comparing signal cmp2 based on output voltage VO and threshold voltage Vth2. When output voltage VO is larger than threshold voltage Vth2, comparing unit 605 is configured to provide a high voltage level comparing signal cmp2, otherwise when output voltage VO is less than threshold voltage Vth2, comparing unit 605 is configured to provide low voltage level comparing signal cmp2.

Logic circuit 606 comprises a first input terminal, a second input terminal and an output terminal, wherein the first input terminal is coupled to the output terminal of rising judge unit 602, the second input terminal is coupled to the output terminal of comparing unit 605, and the output terminal is configured to provide a timing trigger signal Ttr2. In one embodiment, logic circuit 606 comprises an AND gate. When output voltage VO increases to threshold voltage Vth2, timing trigger signal Ttr2 is effective, e.g., high voltage level.

Timing unit 607 comprises a start terminal Start, a stop terminal Stop and an output terminal, wherein the start terminal Start is coupled to the output terminal of rising judge unit 602 and the output terminal of comparing unit 605 through logic circuit 606, the stop terminal Stop is coupled to the output terminal of comparing unit 601 through logic circuit 603, and the output terminal is configured to provide a count signal cnt2. In one embodiment, the stop terminal Stop of timing unit 607 is coupled to the output terminal of comparing unit 601 and the output terminal of rising judge unit 602 through logic circuit 603. When output voltage VO is larger than threshold voltage Vth2 and output voltage VO is recognized increasing, timing trigger signal Ttr2 is effective, timing unit 607 starts timing. And when output voltage VO increases to threshold voltage Vth1, timing unit 607 stops timing and then provide count signal cnt2, where count signal cnt2 represents a time interval during which output voltage VO increases from threshold voltage Vth2 to threshold voltage Vth1. In one embodiment, threshold voltage Vth2 is less than threshold voltage Vth1, and threshold voltage Vth1 is less than output target DVO. In one embodiment, threshold voltage Vth1 equals to output target DVO minus a constant value M, i.e., DVO-M, and threshold voltage Vth2 equals output target DVO minus a constant value 2M, i.e., DVO-2M.

Computing unit 608 comprises an input terminal and an output terminal, wherein the input terminal is coupled to the output terminal of timing unit 607 to receive count signal cnt2, and the output terminal is coupled to the second input terminal of timing unit 604 to provide OFF time period Toff based on count signal cnt2. In one embodiment, OFF time period Toff is proportionally to a difference between input voltage VIN and output voltage VO, (i.e., VIN−VO). In one embodiment, OFF time period Toff is inversely proportional to output voltage VO.

In one embodiment, OFF time period Toff is:

$$Toff=cnt2(VIN-VO)/VO \quad (1)$$

As shown in the example of FIG. 6, it is flexible and convenient to calculate optimized OFF time period Toff for different applications by overshoot control circuit 600.

Figure 7:
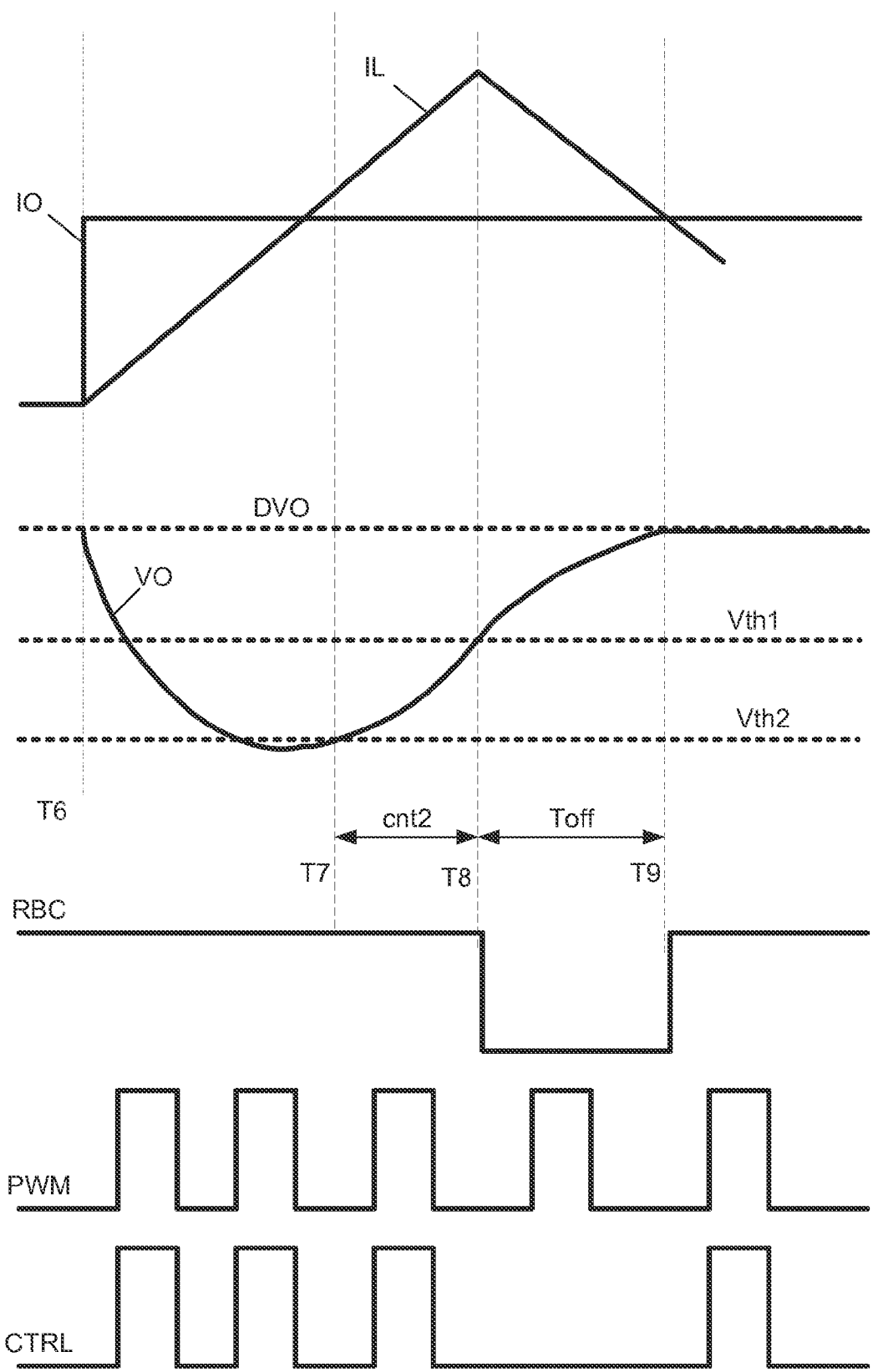
FIG. 7 shows waveforms illustrating signals of a step-down converter under control of overshoot control circuit 600 as shown in FIG. 6 when load current increases at a fast rate according to an embodiment of the present invention.

FIG. 7 shows waveforms illustrating signals of a step-down converter under control of overshoot control circuit 600 as shown in FIG. 6 when load current increases at a fast rate according to an embodiment of the present invention. As shown in FIG. 7, at time T6, load current IO increases at a fast rate, output voltage VO decreases quickly and inductor current IL increases slowly, overshoot control signal RBC keeps high voltage level, i.e., ineffective, and switching control signal CTRL is determined by pulse signal PWM. At time T7, output voltage VO increases to threshold voltage Vth2, and timing unit 607 starts timing. At time T8, output voltage VO increases to threshold voltage Vth1, timing unit 607 stops timing and provide count signal cnt2, where count signal cnt2 represents a time interval (T8-T7) during which output voltage VO increases from threshold voltage Vth2 to threshold voltage Vth1. At time T8, overshoot control signal RBC becomes low voltage level, i.e., effective, and switching control signal CTRL is low to maintain high-side switch M1 OFF. At time T9, a time period during which high-side switch M1 maintained OFF (i.e., overshoot control signal RBC maintains effective) equals to predetermined OFF time period Toff, overshoot control signal RBC transits to ineffective (high voltage level as one example shown in FIG. 7), switching control signal CTRL is determined by pulse signal PWM, and high-side switch M1 resumes normal operation, i.e., controlled based on pulse signal PWM. In one embodiment, threshold voltage Vth1 equals to output target DVO minus a constant value M, i.e., DVO-M, threshold voltage Vth2 equals output target DVO minus a constant value 2M, i.e., DVO−2M, and OFF time period Toff equals to cnt2(VIN−VO)/VO.

Figure 8:
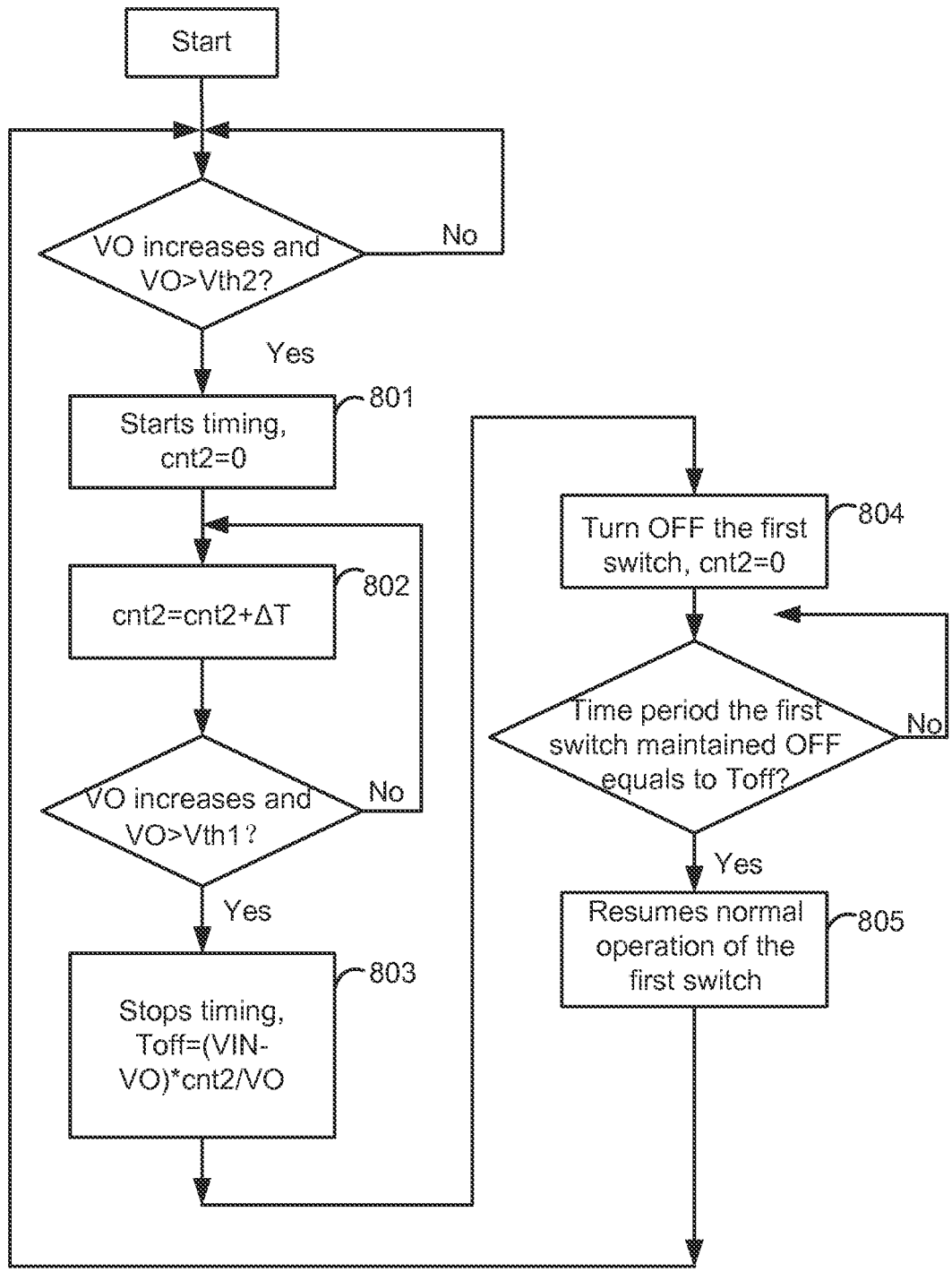
FIG. 8 shows a flow chart illustrating a control method with reference to switch mode power supply 200 shown in FIG. 2 according to another embodiment of the present invention.

FIG. 8 shows a flow chart illustrating a control method with reference to switch mode power supply 200 shown in FIG. 2 according to another embodiment of the present invention. In one embodiment, the control method comprises: when output voltage VO increases to threshold voltage Vth1, turning OFF the first switch and maintaining the first switch OFF during OFF time period Toff, wherein OFF time period Toff is set based on a time interval during which output voltage VO increases from threshold voltage Vth2 to threshold voltage Vth1. In one embodiment, threshold voltage Vth1 equals to output target DVO minus a constant value M, i.e., DVO-M, and threshold voltage Vth2 equals to output target DVO minus a constant value 2M, i.e., DVO-2M.

When switch mode power supply 200 starts working, if output voltage VO increases larger than threshold voltage Vth2, then go into step 801. In step 801, starts timing and a count signal cnt2 is reset to zero. In step 802, count signal cnt2 increases by one step, i.e., cnt2=cnt2+ΔT, where ΔT may be one or more system clock period. When output voltage VO increases to threshold voltage Vth1, then go into step 803. Otherwise, when output voltage VO is less than threshold voltage Vth1, then returns to step 802. In step 803, stops timing and OFF time period Toff equals to cnt2 (VIN−VO)/VO, where count signal cnt2 represents a time interval during which output voltage VO increases from threshold voltage Vth2 to threshold voltage Vth1. In step 804, the first switch is turned OFF, and count signal cnt2 is reset to zero. When a time period the first switch maintained off equals to OFF time period Toff, go into step 805 to resume normal operation of the first switch, e.g., turn ON and/or turn OFF the first switch by switching control unit 221.

Note that in the flow chart described above, the box functions may also be implemented with different order as shown in FIG. 8. For example, two successive box functions may be executed meanwhile, or sometimes the box functions may be executed in reverse order.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

I claim:

1. A control circuit for controlling a switch mode power supply, the switch mode power supply having an output terminal configured to provide an output voltage which is configured to regulate to an output target, the switch mode power supply comprises a first switch having a control terminal, wherein the control circuit comprising:
   a switching control unit, having an output terminal, wherein the output terminal is configured to provide a pulse signal based on the output voltage and the output target;
   an overshoot control unit, having an output terminal, wherein the output terminal is configured to provide an overshoot control signal based on the output voltage and a first threshold voltage; and
   a first logic unit, having a first input terminal, a second input terminal and an output terminal, wherein the first input terminal is coupled to the output terminal of the switching control unit to receive the pulse signal, the second input terminal is coupled to the output terminal of the overshoot control unit to receive the overshoot control signal, and the output terminal is configured to provide a switching control signal to the control terminal of the first switch based on the pulse signal and the overshoot control signal; and wherein the first switch is turned OFF when the overshoot control signal is in a first state, and the first switch is controlled based on the pulse signal when the overshoot control signal is in a second state; wherein when the output voltage increases to the first threshold voltage, the control circuit is configured to turn OFF the first switch, and wherein the first threshold voltage is less than the output target.

2. The control circuit of claim 1, wherein the overshoot control signal is configured to transit to the first state when the output voltage increases to the first threshold voltage, and then after a time period maintained in the first state, the overshoot control signal is configured to transit to the second state.

3. The control circuit of claim 2, wherein the control circuit is configured to provide the time period based on a time interval during which the output voltage increases from a second threshold voltage to the first threshold voltage.

4. The control circuit of claim 1, wherein the overshoot control unit comprising:

a first comparing unit, having a first input terminal, a second input terminal and an output terminal, wherein the first input terminal is coupled to the output voltage, the second input terminal is coupled to the first threshold voltage;

a rising judge unit, having an output terminal, wherein the output terminal is configured to provide a status signal based on the output voltage, wherein the status signal is configured to indicate if the output voltage is increasing; and a first timing unit, having a first input terminal, a second input terminal and an output terminal, wherein the first input terminal is coupled to the output terminal of the first comparing unit and the output terminal of the rising judge unit, the second input terminal is configured to receive a count signal representing a time period, and the output terminal is configured to provide the overshoot control signal based on the first comparing signal, the status signal and the time period; and wherein when the output voltage is larger than the first threshold voltage and the output voltage is recognized increasing, the overshoot control signal is configured to transit to the first state and the first timing unit is configured to start timing; and when a time interval that the first timing unit timed equals to the time period, the overshoot control signal is configured to transit to the second state and the first timing unit is configured to stop timing.

5. The control circuit of claim 4, wherein the time period is calculated based on a time interval during which the output voltage increases from a second threshold voltage to the first threshold voltage.

6. The control circuit of claim 4, wherein the overshoot control unit further comprising:

a second comparing unit, having a first input terminal, a second input terminal and an output terminal, wherein the first input terminal is coupled to the output voltage, and the second input terminal is coupled to a second threshold voltage, wherein the second threshold voltage is less than the first threshold voltage; and a second timing unit, having a start terminal, a stop terminal and an output terminal, wherein the start terminal is coupled to the output terminal of the second comparing unit, the stop terminal is coupled to the output terminal of the first comparing unit, and the output terminal is coupled to the second input terminal of the first timing unit.

7. The control circuit of claim 1, wherein the switching control unit comprising:

a comparator, having a first input terminal, a second input terminal and an output terminal, wherein the first input terminal is coupled to a reference voltage, the second input terminal is coupled to a feedback signal representing the output voltage, and the output terminal is configured to provide a set signal via comparing the reference voltage with the feedback signal;

an ON-time control unit, having an input terminal and an output terminal, wherein the input terminal is coupled to the pulse signal, and the output terminal is configured to provide an ON-time control signal; and a flip-flop, having a set terminal, a reset terminal and an output terminal, wherein the set terminal is coupled to the output terminal of the comparator to receive the set signal, the reset terminal is coupled to the output terminal of the ON-time control unit to receive the ON-time control signal, and the output terminal is configured to provide the pulse signal.

8. A switch mode power supply, having an input terminal coupled to an input voltage and an output terminal configured to provide an output voltage, wherein the switch mode power supply comprising:

a first switch, having a first terminal, a second terminal and a control terminal, wherein the first terminal is coupled to the input terminal of the switch mode power supply, and wherein the output voltage is regulated to an output target via turning ON and/or turning OFF the first switch; and a control circuit, having an input terminal and an output terminal, wherein the input terminal is coupled to the output voltage, and the output terminal is coupled to the control terminal of the first switch to provide a switching control signal; and wherein when the output voltage increases to a first threshold voltage, the control circuit is configured to turn OFF the first switch until a time period, and wherein the first threshold voltage is less than the output target.

9. The switch mode power supply of claim 8, wherein the switch mode power supply further comprising:

a second switch, having a first terminal, a second terminal and a control terminal, wherein the first terminal is coupled to the second terminal of the first switch, the second terminal is coupled to a system ground, and the control terminal is coupled to the output terminal of the control circuit;

an inductor, having a first terminal and a second terminal, wherein the first terminal is coupled to the second terminal of the first switch and the first terminal of the second switch; and a capacitor, having a first terminal and a second terminal, wherein the first terminal is coupled to the second terminal of the inductor, and the second terminal is coupled to the system ground.

10. The switch mode power supply of claim 8, wherein the time period is based on a time interval during which the output voltage increases from a second threshold voltage to the first threshold voltage.

11. The switch mode power supply of claim 10, wherein a difference between the second threshold voltage and the first threshold voltage equals a difference between the first threshold voltage and the output target.

12. The switch mode power supply of claim 8, wherein the control circuit comprising:
- a switching control unit, having an output terminal, wherein the output terminal is configured to provide a pulse signal based on the output voltage and the output target, wherein the pulse signal is configured to regulate the output voltage to the output target;
- an overshoot control unit, having an output terminal, wherein the output terminal is configured to provide an overshoot control signal based on the output voltage and the first threshold voltage; and
- a first logic unit, having a first input terminal, a second input terminal and an output terminal, wherein the first input terminal is configured to receive the pulse signal, and the second input terminal is configured to receive the overshoot control signal, and the output terminal is configured to provide a switching control signal to the control terminal of the first switch based on the pulse signal and the overshoot control signal; and wherein
- when the overshoot control signal is in a first state, the first logic unit is configured to turn OFF the first switch for the time period; and
- when the overshoot control signal is in a second state, the first logic unit is configured to provide the switching control signal based on the pulse signal.

13. The switch mode power supply of claim 12, wherein the overshoot control signal is configured to transit to the first state when the output voltage increases to the first threshold voltage, and then after the time period maintained in the first state, the overshoot control signal is configured to transit to the second state.

14. The switch mode power supply of claim 12, wherein the overshoot control unit comprising:
- a first comparing unit, having a first input terminal, a second input terminal and an output terminal, wherein the first input terminal is coupled to the output voltage, the second input terminal is coupled to the first threshold voltage;
- a rising judge unit, having an output terminal, wherein the output terminal is configured to provide a status signal based on the output voltage, wherein the status signal is configured to indicate if the output voltage is increasing; and
- a first timing unit, having a first input terminal, a second input terminal and an output terminal, wherein the first input terminal is coupled to the output terminal of the first comparing unit and the output terminal of the rising judge unit, the second input terminal is configured to receive a count signal representing the predetermined OFF time period, and the output terminal is configured to provide the overshoot control signal based on the first comparing signal, the status signal and the predetermined OFF time period; and wherein
- when the output voltage increases to the first threshold voltage, the overshoot control signal is configured to transit to the first state and the first timing unit is configured to start timing; and
- when a time interval that the first timing unit timed equals to the predetermined OFF time period, the overshoot control signal is configured to transit to the second state and the first timing unit is configured to stop timing.

15. The switch mode power supply of claim 14, wherein the overshoot control circuit further comprising:
- a second comparing unit, having a first input terminal, a second input terminal and an output terminal, wherein the first input terminal is coupled to the output voltage, and the second input terminal is coupled to a second threshold voltage, wherein the second threshold voltage is less than the first threshold voltage;
- a second timing unit, having a start terminal, a stop terminal and an output terminal, wherein the start terminal is coupled to the output terminal of the second comparing unit, and the stop terminal is coupled to the output terminal of the first comparing unit; and
- a computing unit, having an input terminal and an output terminal, wherein the input terminal is coupled to the output terminal of the second timing unit, and the output terminal is coupled to the second input terminal of the first timing unit.

16. A control method for a switch mode power supply, the switch mode power supply having an input terminal coupled to an input voltage and an output terminal configured to provide an output voltage, the switch mode power supply comprising a first switch, the control method comprising:
- providing a pulse signal based on the output voltage and an output target, wherein the output voltage is regulated to the output target;
- providing an overshoot control signal based on the output voltage and a first threshold voltage; and
- turning ON and/or OFF the first switch based on the pulse signal and the overshoot control signal; and wherein
- the overshoot control signal is configured to transit to a first state when the output voltage increases to the first threshold voltage, and then after a time period maintained in the first state, the overshoot control signal is configured to transit to a second state.

17. The control method of claim 16, wherein the first switch is turned OFF when the overshoot control signal is in the first state, and the first switch is turned ON and/or OFF by the pulse signal when the overshoot signal is in the second state.

18. The control method of claim 16, wherein the time period is provided based on a time interval during which the output voltage increases from a second threshold voltage to the first threshold voltage.

19. The control method of claim 18, wherein a difference between the second threshold voltage and the first threshold voltage equals a difference between the first threshold voltage and the output target.

20. The control method of claim 18, wherein the time period is proportional to a difference between the input voltage and the output voltage, and the first time period is inversely proportional to the output voltage.

* * * * *